US008976839B2

(12) United States Patent
Chen et al.

(10) Patent No.: US 8,976,839 B2
(45) Date of Patent: Mar. 10, 2015

(54) METHOD, DEVICE AND SYSTEM FOR CONFIGURING CODEBOOK

(75) Inventors: Yijian Chen, Shenzhen (CN); Hui Yu, Shenzhen (CN); Yu Ngok Li, Shenzhen (CN); Jun Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/634,574

(22) PCT Filed: Dec. 27, 2010

(86) PCT No.: PCT/CN2010/080326
§ 371 (c)(1),
(2), (4) Date: Sep. 13, 2012

(87) PCT Pub. No.: WO2012/022100
PCT Pub. Date: Feb. 23, 2012

(65) Prior Publication Data
US 2013/0136203 A1    May 30, 2013

(30) Foreign Application Priority Data
Aug. 16, 2010  (CN) .......................... 2010 1 0247514

(51) Int. Cl.
*H04B 1/00*    (2006.01)
*H04B 1/62*    (2006.01)
(Continued)

(52) U.S. Cl.
CPC ................ *H04B 1/62* (2013.01); *H04B 7/0639* (2013.01); *H04L 5/0023* (2013.01); *H04L 25/03949* (2013.01); *H04B 7/0478* (2013.01)
USPC ............ 375/141; 375/146; 375/147; 375/267

(58) Field of Classification Search
CPC ... H04B 7/0639; H04B 7/0626; H04B 7/0456
USPC ......... 375/141, 144, 146–148, 219, 220, 267, 375/285, 299, 340, 349
See application file for complete search history.

(56) References Cited

U.S. PATENT DOCUMENTS 7,769,098 B2 *   8/2010   Borkar et al. ................. 375/267
7,813,458 B2 *  10/2010   van Waes et al. ............. 375/347
(Continued)

FOREIGN PATENT DOCUMENTS

CN       101800628 A       8/2010
CN       101917365 A      12/2010
(Continued)

OTHER PUBLICATIONS

International Search Report for PCT/CN2010/080326 dated May 3, 2011.
(Continued)

*Primary Examiner* — Dac Ha
(74) *Attorney, Agent, or Firm* — Ling Wu; Stephen Yang; Ling and Yang Intellectual Property

(57) ABSTRACT

The present invention discloses a method, device and system for configuring codebooks. The method comprises a transmitting end selecting a code word restricted sub-set and informing a receiving end of the code word restricted sub-set, the code word restricted sub-set containing part or all of code words in a first codebook and/or a second codebook; and the receiving end selecting an optimal pre-coded code word from the code word restricted sub-set and informing the transmitting end of an index of the optimal pre-coded code word. By the present invention, code word restriction is implemented in the case of dual codebooks in the LTE-A system such that the calculation complexity is reduced when the receiving end selects the code word, occurrences of the case where the receiving end selects the code word wrongly are decreased, and the signaling structure in the LTE system can be inherited very well.

14 Claims, 1 Drawing Sheet

(51) Int. Cl.
  *H04B 7/06* (2006.01)
  *H04L 25/03* (2006.01)
  *H04B 7/04* (2006.01)
  *H04L 5/00* (2006.01)

(56) References Cited

U.S. PATENT DOCUMENTS

| | | | |
|---|---|---|---|
| 8,369,439 B2* | 2/2013 | Rheinschmitt et al. | 375/267 |
| 2005/0157808 A1* | 7/2005 | Ihm et al. | 375/267 |
| 2009/0245410 A1* | 10/2009 | Lee et al. | 375/267 |
| 2010/0039990 A1* | 2/2010 | Jongren et al. | 370/328 |
| 2010/0232539 A1* | 9/2010 | Han et al. | 375/285 |
| 2013/0058386 A1* | 3/2013 | Mazzarese | 375/219 |
| 2013/0272351 A1* | 10/2013 | Hammarwall et al. | 375/219 |

FOREIGN PATENT DOCUMENTS

| | | |
|---|---|---|
| WO | 2008147121 A1 | 12/2008 |
| WO | 2009134357 A1 | 11/2009 |
| WO | 2010050689 A2 | 5/2010 |

OTHER PUBLICATIONS

"Further Performance Evaluation of LTE-A DL MIMO with 2-Level codebook"; ZTE, 6.3.4, Discussion and Decision; 3GPP TSG RAN WG1 Meeting #61bis; Dresden, Germany, Jun. 28-Jul. 2, 2010; R1-103595, See pp. 2-11/E.

"Double codebook design principles"; Nokia, Nokia Siemens Networks 6.3.4, Discussion and Decision; 3GPP TSG-RAN WG1 Meeting #61bis; Dresden, Germany, Jun. 28-Jul. 2, 2010, R1-103804, See pp. 2-10/E.

* cited by examiner

METHOD, DEVICE AND SYSTEM FOR CONFIGURING CODEBOOK

TECHNICAL FIELD

The present invention relates to the field of mobile communication technology, and in particular, to a method, device and system for configuring codebooks.

BACKGROUND ART

In a wireless communication system, multiple antennae are used at both transmitting and receiving ends so as to obtain a higher rate by means of spatial multiplexing. Since the receiving end can obtain a channel matrix, through which transmitted signals pass, through channel estimation, even if each antenna transmits different data, the receiving end can still parse out the transmitted data on each antenna which has passed through Multiple-Input Multiple-Out-put (MIMO) channel matrix.

Compared with a method of directly parsing the transmitted data on each antenna using the channel matrix, a simple and efficient method is to use the pre-coding technology. When the transmitting end knows the channel status, the pre-coding technology can equivalently change the channel transfer matrix according to requirements. The transmitting end pre-codes data in layers, maps it to antennae and then sends it to the receiving end through a wireless channel. If accurate channel status information (CSI) can be known at the transmitting end, singular value decomposition can be implemented for specific channel matrices. Afterwards, a right singular matrix decomposed from the channel matrix is used as a pre-coding matrix, and the data in the layers is pre-coded. However, the CSI generally can only be acquired accurately and directly at the receiving end, and the transmitting end can only obtain the CSI through feedback of the CSI from the receiving end to the transmitting end. In a practical system, the cost will be huge if the CSI is fed back directly, and meanwhile it will be limited by the feedback overhead of the practical system. Therefore, a commonly used method is codebook-based feedback. That is, the receiving end selects a suitable code word from a codebook according to the current channel status and feeds an index value of the code word in the codebook set to the transmitting end, thereby greatly reducing the amount of feedback.

The codebook-based pre-coding is a form of channel qualification. Assuming that the limited feedback channel capacity is B bps/Hz, then the number of available code words is $N=2^B$. The feature vector space of the channel matrix is qualified to constitute a codebook space $\mathfrak{R} = \{F_1, F_2 \Lambda F_N\}$. The transmitting end and the receiving end collectively store or generate in real time this codebook $\mathfrak{R}$ (which is the same for both the transmitting end and the receiving end). Taking the pre-coding technology used by the Long Term Evolution (LTE) system as an example, the receiving end selects an optimal code word $\hat{F}$ from the codebook space $\mathfrak{R}$ according to certain rules, and recommends an index i of the code word $\hat{F}$ to the transmitting end. Herein, the index of the code word is referred to as the Precoding Matrix Indicator (PMI) in the codebook. The transmitting end can directly find the corresponding pre-coded code word $\hat{F}$ for transmission according to this index i, or it may directly select the code word itself for transmission instead of accepting the code word recommended by the receiving end. The receiving end will be informed of the index of the actually used code word during the transmitting process.

The Long Term Evolution Advanced (LTE-A) system, which is the evolution standard of the LTE, supports a larger system bandwidth (up to 100 MHz), and is backward compatible with the existing standard of the LTE. In order to increase the coverage of cell edges and throughput, the LTE-A supports transmission up to 8 antennae and 8 layers in the downlink on the basis of LTE system, and proposes some technologies for feedback enhancement, which mainly improve the feedback accuracy of the codebook and can improve the utilization ratio of frequency spectrum of the International Mobile Telecommunications-Advance (IMT-Advance) system and alleviate the shortage of frequency spectrum resources. Currently a consensus reached in the conference of the 3GPP RAN1 group for the enhanced feedback technology will be described below.

1) A pre-coding/feedback structure of one sub-band consists of two matrices.

2) Each of the two matrices belongs to a separate codebook. The codebook is known in advance to both a base station and user equipment (UE). The codebook may vary in different times and different sub-bands.

3) One matrix represents the attribute of bandwidth or long-time channel, while the other matrix represents the attribute of the determined frequency band or short-time channel.

4) The codebook used is represented in a form of limited countable matrix sets, and each matrix is knowable to the UE and the base station.

Herein, it can be seen that a structure based on dual codebooks is proposed for feedback of channel information. Specifically, for one sub-band or multiple united sub-bands that needs the feedback of the channel information, the UE feeds back at least two pieces of PMI information, PMI1 and PMI2 respectively, to the base station, wherein PMI1 corresponds to a code word W1 in one codebook C1, while PMI2 corresponds to a code word W2 in another codebook C2. The base station has the same information of C1 and C2, and finds out the corresponding code words W1 and W2 from the corresponding codebooks C1 and C2 after receiving the PMI1 and PMI2, and obtains the channel information according to the appointed function rule F (W1, W2).

The size of the codebook generally determines the signaling overhead, and generally the larger the size of the codebook is, the better performance can be obtained. Therefore, the compromise between performance and overhead is generally taken into consideration in codebook design. In practical codebook design, many factors are generally considered, for example, the design is adapted to as many as possible channel environments and antenna configuration modes. Therefore, in a certain particular transmission condition, all code words in the codebook are not necessarily adapted to the current particular transmission condition, but the receiving end needs to traverse all the code words in the codebook when selecting a code word. This will not only bring increase of calculation complexity to the receiving end, but also increase occurrences of the case where the receiving end wrongly selects the code word due to some non-ideal processes, especially in the case of larger codebook design.

SUMMARY OF THE INVENTION

A technical problem to be solved by the present invention is to provide a method, device and system for configuring codebooks so as to decrease the calculation complexity of a receiving end when selecting a code word and reduce occurrences of the case where the receiving end wrongly selects the code word.

In order to solve the above technical problem, the present invention provides a method for configuring codebooks, which is applied in a Long Term Evolution Advanced (LTE-A) system and comprises:

a transmitting end selecting a code word restricted sub-set and informing a receiving end of the code word restricted sub-set, the code word restricted sub-set containing part or all of code words in a first codebook and/or a second codebook; and the receiving end selecting an optimal pre-coded code word from the code word restricted sub-set and informing the transmitting end of an index of the optimal pre-coded code word.

Preferably, the method may also have the following features:

in the step of the transmitting end selecting the code word restricted sub-set and informing the receiving end of the code word restricted sub-set, the transmitting end informs the receiving end of the selected code word restricted sub-set through a high-layer signaling.

Preferably, the method may also have the following features:

in the step of the transmitting end selecting the code word restricted sub-set and informing the receiving end of the code word restricted sub-set, the transmitting end informs the receiving end of the selected code word restricted sub-set by sending to the receiving end a signaling carrying a restricted sub-set bitmap;

wherein each information bit in the restricted sub-set bitmap is associated with a code word for indicating whether the associated code word belongs to the code word restricted sub-set.

Preferably, the method may also have the following features:

in the step of the transmitting end selecting the code word restricted sub-set and informing the receiving end of the code word restricted sub-set, the transmitting end configures the restricted sub-set bitmap in one of the following ways:

(1) performing sub-set restriction on the code words in the first codebook and the second codebook jointly, wherein a code word in the first codebook and a code word in the second codebook are taken as a code word combination, each code word combination is associated with one information bit in the restricted sub-set bitmap, and the code word restricted sub-set contains code words extracted from the first codebook and code words extracted from the second codebook;

(2) performing sub-set restriction only on the code words in the first codebook, wherein each code word in the first codebook is associated with one information bit in the restricted sub-set bitmap, and the code word restricted sub-set contains code words extracted from the first codebook and all code words in the second codebook;

(3) performing sub-set restriction only on the code words in the second codebook, wherein each code word in the second codebook is associated with one information bit in the restricted sub-set bitmap, and the code word restricted sub-set contains code words extracted from the second codebook and all code words in the first codebook; and (4) performing sub-set restriction on the code words in the first codebook and the second codebook separately, wherein, each code word in the first codebook and the second codebook is associated with one information bit in the restricted sub-set bitmap, and the code word restricted sub-set contains code words extracted from the first codebook and code words extracted from the second codebook.

Preferably, the method may also have the following features:

the restricted sub-set bitmap contains L information bits;

when sub-set restriction is performed on the code words in the first codebook and the second codebook jointly, $L=2^{M+N}$;

when sub-set restriction is only performed on the code words in the first codebook, $L=2^{M}$;

when sub-set restriction is only performed on the code words in the second codebook, $L=2^{N}$; and when sub-set restriction is performed on the code words in the first codebook and the second codebook separately, $L=2^{M}+2^{N}$;

wherein the first codebook contains M code words, and the second codebook contains N code words.

Preferably, the method may also have the following features:

the code word restricted sub-set further contains all code words in a single codebook in the case where the single codebook is used; and in the step of the receiving end selecting the optimal pre-coded code word from the code word restricted sub-set and informing the transmitting end of the index of the optimal pre-coded code word, the receiving end selects the optimal pre-coded code word from the code words of the first codebook and the second codebook contained in the code word restricted sub-set, or selects the optimal pre-coded code word from the code words of the single codebook contained in the code word restricted sub-set, according to values of transmission ranks.

Preferably, the method may also have the following features:

the receiving end informs the transmitting end of the index of the optimal pre-coded code word in a manner of periodic feedback and/or non-periodic feedback; and in the step of the transmitting end selecting the code word restricted sub-set and informing the receiving end of the code word restricted sub-set, the transmitting end selects the same code word restricted sub-set, or selects different code word restricted sub-sets separately according to the manner of periodic feedback and non-periodic feedback used by the receiving end.

In order to solve the above technical problem, the present invention provides a device for configuring codebooks comprising a first selecting module and a first transmitting and receiving module, wherein the first selecting module is configured to select a code word restricted sub-set and inform the first transmitting and receiving module of the code word restricted sub-set, the code word restricted sub-set containing part or all of code words in a first codebook and/or a second codebook; and the first transmitting and receiving module is configured to inform a receiving end of the selected code word restricted sub-set.

Preferably, the device may also have the following features:

the first selecting module is configured to inform the first transmitting and receiving module of the selected code word restricted sub-set by sending a restricted sub-set bitmap to the first transmitting and receiving module; and the first transmitting and receiving module is configured to inform the receiving end of the selected code word restricted sub-set by sending to the receiving end a signaling carrying the restricted sub-set bitmap;

wherein each information bit in the restricted sub-set bitmap is associated with a code word for indicating whether the associated code word belongs to the code word restricted sub-set.

Preferably, the device may also have the following features:

the first selecting module is configured to configure the restricted sub-set bitmap in one of the following ways:

(1) performing sub-set restriction on the code words in the first codebook and the second codebook jointly, wherein a code word in the first codebook and a code word in the second codebook are taken as a code word combination, each code word combination is associated with one information bit in the restricted sub-set bitmap, and the code word restricted sub-set contains code words extracted from the first codebook and code words extracted from the second codebook;

(2) performing sub-set restriction only on the code words in the first codebook, wherein each code word in the first codebook is associated with one information bit in the restricted sub-set bitmap, and the code word restricted sub-set contains code words extracted from the first codebook and all code words in the second codebook;

(3) performing sub-set restriction only on the code words in the second codebook, wherein each code word in the second codebook is associated with one information bit in the restricted sub-set bitmap, and the code word restricted sub-set contains code words extracted from the second codebook and all code words in the first codebook; and (4) performing sub-set restriction on the code words in the first codebook and the second codebook separately, wherein each code word in the first codebook and the second codebook is associated with one information bit in the restricted sub-set bitmap, and the code word restricted sub-set contains code words extracted from the first codebook and code words extracted from the second codebook.

Preferably, the device may also have the following features: the first selecting module is further configured such that:

the restricted sub-set bitmap comprises L information bits;

when sub-set restriction is performed on the code words in the first codebook and the second codebook jointly, $L=2^{M+N}$;

when sub-set restriction is only performed on the code words in the first codebook, $L=2^M$;

when sub-set restriction is only performed on the code words in the second codebook, $L=2^N$; and when sub-set restriction is performed on the code words in the first codebook and the second codebook separately, $L=2^M+2^N$;

wherein the first codebook contains M code words, and the second codebook contains N code words.

Preferably, the device may also have the following features:

the first selecting module is further configured such that the transmitting end selects the same code word restricted sub-set, or selects different code word restricted sub-sets separately according to a manner of periodic feedback and non-periodic feedback used by the receiving end.

In order to solve the above technical problem, the present invention provides a system for configuring codebooks comprising a transmitting end comprising the device described above and a receiving end comprising a second selecting module and a second transmitting and receiving module, wherein the second transmitting and receiving module is configured to obtain a code word restricted sub-set selected by the transmitting end and inform the second selecting module of the selected code word restricted sub-set, and inform the transmitting end of an index of an optimal pre-coded code word selected by the second selecting module; and the second selecting module is configured to select the optimal pre-coded code word from the code word restricted sub-set, and inform the second transmitting and receiving module of the index of the optimal pre-coded code word.

By the present invention, code word restriction is implemented in the case of dual codebooks in the LTE-A system such that the calculation complexity is reduced when the receiving end selects the code word, occurrences of the case where the receiving end selects the code word wrongly are decreased, and the signaling structure in the LTE system can be inherited very well.

PREFERRED EMBODIMENTS OF THE PRESENT INVENTION

In the present invention, sub-set restriction is performed for code words of dual codebooks, so as to reduce the calculation complexity when a receiving end selects a code word. The present invention allows the system to self-define a codebook in practical applications, and the self-defined codebook (referred to as a code word restricted sub-set) is a currently used codebook for channel information qualification, and contains all or part of code words of a codebook defined in the standard, or contains all or part of code words and one or more transmission ranks defined in the standard, or contains a combination of code words and transmission ranks. The function of such a self-defined codebook is called as codebook restricting function, and the receiving end may be informed of the code word restricted sub-set via a high-layer signaling. After being informed of the specific configuration of sub-set restriction, the receiving end will selects the optimal pre-coded code word from the code words of the code word restricted sub-set.

Figure 1:
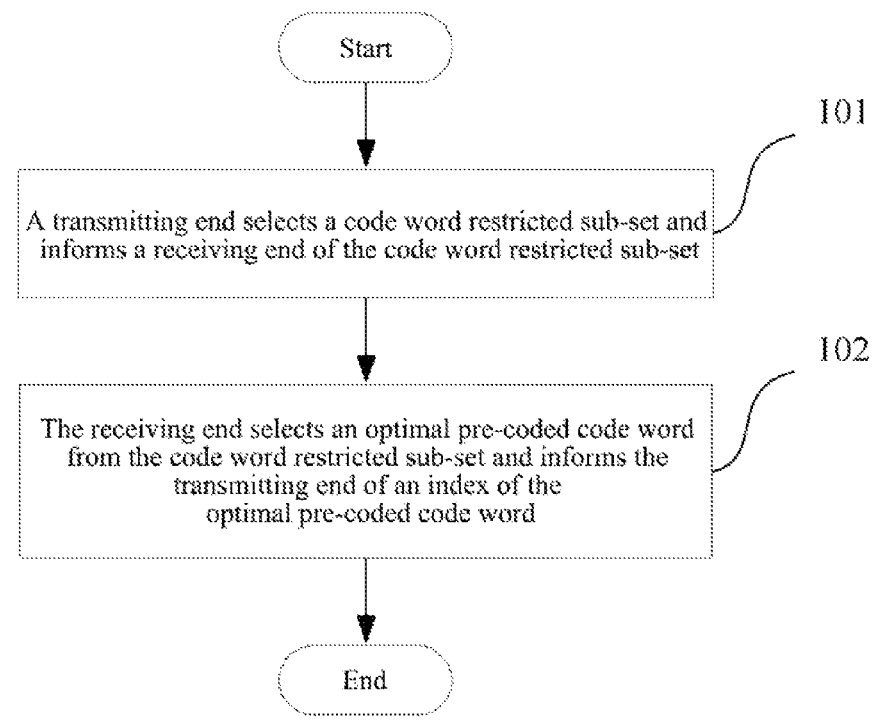
FIG. 1 is a flowchart of a method for configuring codebooks according to an embodiment of the present invention.

Specifically, as shown in FIG. 1, a method for configuring codebooks in accordance with an embodiment of the present invention, which may be applied in a LTE-A system, comprises the following steps.

In step 101, a transmitting end selects a code word restricted sub-set and informs a receiving end of the code word restricted sub-set; the code word restricted sub-set contains part or all of code words in a first codebook and/or a second codebook;

In step 102, the receiving end selects an optimal pre-coded code word from the code word restricted sub-set and informs the transmitting end of an index of the optimal pre-coded code word.

The transmitting end and the receiving end has known all the code words in the first codebook and the second codebook in advance, and the transmitting end has known multiple sub-sets in which code words in the first codebook and the second codebook are restricted, i.e., code word restricted sub-sets.

The transmitting end may inform the receiving end of the selected code word restricted sub-set via a high-layer signaling (for example, the Radio Resource Control (RRC) signaling).

Specifically, the transmitting end may inform the receiving end of the selected code word restricted sub-set by sending to the receiving end a signaling carrying a restricted sub-set bitmap.

The restricted sub-set bitmap may specify all code word restricted sub-sets that may be used by the receiving end, and each information bit in the restricted sub-set bitmap is associated with a code word for indicating whether the associated code word belongs to the code word restricted sub-set. For example, when the value of the information bit is 1, it is indicated that the associated code word is selected in the code word restricted sub-set, while when the value of the information bit is 0, it is indicated that the associated code word is not selected in the code word restricted sub-set.

Furthermore, the transmitting end may configure the restricted sub-set bitmap in one of the following ways to implement sub-set restriction:

(1) performing sub-set restriction on the code words in the first codebook and the second codebook jointly, wherein a code word in the first codebook and a code word in the second codebook are taken as a code word combination, each code word combination is associated with one information bit in the restricted sub-set bitmap, and the code word restricted sub-set contains code words extracted from the first codebook and code words extracted from the second codebook;

(2) performing sub-set restriction only on the code words in the first codebook, wherein each code word in the first codebook is associated with one information bit in the restricted sub-set bitmap, and the code word restricted sub-set contains code words extracted from the first codebook and all code words in the second codebook;

(3) performing sub-set restriction only on the code words in the second codebook, wherein each code word in the second codebook is associated with one information bit in the restricted sub-set bitmap, and the code word restricted sub-set contains code words extracted from the second codebook and all code words in the first codebook; and (4) performing sub-set restriction on the code words in the first codebook and the second codebook separately, wherein each code word in the first codebook and the second codebook is associated with one information bit in the restricted sub-set bitmap, and the code word restricted sub-set contains code words extracted from the first codebook and code words extracted from the second codebook.

The restricted sub-set bitmap contains L information bits (i.e., L bits), the first codebook contains M code words, and the second codebook contains N code words (i.e., the size of the first codebook is M bits, and the size of the second codebook is N bits).

When sub-set restriction is performed on the code words in the first codebook and the second codebook jointly, $L=2^{M+N}$.

When sub-set restriction is only performed on the code words in the first codebook, $L=2^{M}$.

When sub-set restriction is only performed on the code words in the second codebook, $L=2^{N}$.

When sub-set restriction is performed on the code words in the first codebook and the second codebook separately, $L=2^{M}+2^{N}$.

The above code word restricted sub-set may further contain all code words in a single codebook in the case where the single codebook is used.

The receiving end may select the optimal pre-coded code word from the code words of the first codebook and the second codebook contained in the code word restricted sub-set, or selects the optimal pre-coded code word from the code words of the single codebook contained in the code word restricted sub-set, according to values of transmission ranks.

The receiving end informs the transmitting end of an index of the optimal pre-coded code word in a manner of periodic feedback and/or non-periodic feedback.

The transmitting end may select the same code word restricted sub-set, or selects different code word restricted sub-sets separately according to the manner of periodic feedback and non-periodic feedback used by the receiving end.

Depending on the manner of periodic feedback and the manner of non-periodic feedback used by the receiving end, if the transmitting end selects the same code word restricted sub-set and the receiving end feeds back the index of the optimal pre-coded code word periodically using a codebook sampling method, the receiving end selects the optimal pre-coded code word from an intersection of the sampled codebook sub-set and the code word restricted sub-set according to a sampling rule.

Figure 2:
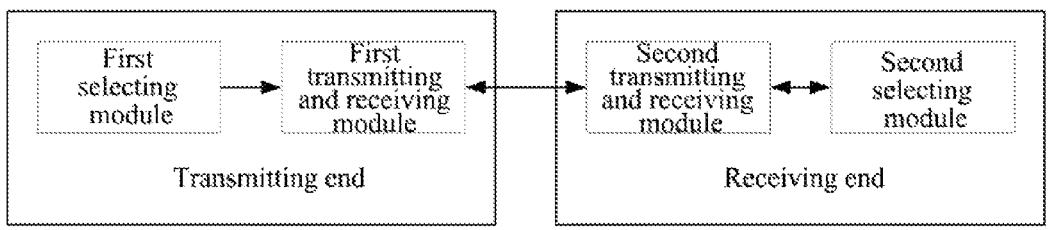
FIG. 2 is a block diagram of a system for configuring codebooks according to an embodiment of the present invention.

As shown in FIG. 2, a system for configuring codebooks according to an embodiment of the present invention applied in a LTE-A system comprises a transmitting end comprising a first selecting module and a first transmitting and receiving module, and a receiving end comprising a second selecting module and a second transmitting and receiving module.

The first selecting module is configured to select a code word restricted sub-set and inform the first transmitting and receiving module of the code word restricted sub-set, the code word restricted sub-set containing part or all of code words in a first codebook and/or a second codebook.

The first transmitting and receiving module is configured to inform a receiving end of the selected code word restricted sub-set.

The second transmitting and receiving module is configured to obtain a code word restricted sub-set selected by the transmitting end and inform the second selecting module of the selected code word restricted sub-set, and inform the transmitting end of an index of an optimal pre-coded code word selected by the second selecting module.

The second selecting module is configured to select the optimal pre-coded code word from the code word restricted sub-set, and inform the second transmitting and receiving module of the index of the optimal pre-coded code word.

Preferably, the first selecting module is further configured to inform the first transmitting and receiving module of the selected code word restricted sub-set by sending a restricted sub-set bitmap to the first transmitting and receiving module.

The first transmitting and receiving module is further configured to inform the receiving end of the selected code word restricted sub-set by sending to the receiving end a signaling carrying the restricted sub-set bitmap.

Each information bit in the restricted sub-set bitmap is associated with a code word for indicating whether the associated code word belongs to the code word restricted sub-set.

Preferably, the first selecting module is further configured to configure the restricted sub-set bitmap in one of the following ways:

(1) performing sub-set restriction on the code words in the first codebook and the second codebook jointly, wherein a code word in the first codebook and a code word in the second codebook are taken as a code word combination, each code word combination is associated with one information bit in the restricted sub-set bitmap, and the code word restricted sub-set contains code words extracted from the first codebook and code words extracted from the second codebook;

(2) performing sub-set restriction only on the code words in the first codebook, wherein each code word in the first codebook is associated with one information bit in the restricted sub-set bitmap, and the code word restricted sub-set contains code words extracted from the first codebook and all code words in the second codebook;

(3) performing sub-set restriction only on the code words in the second codebook, wherein each code word in the second codebook is associated with one information bit in the restricted sub-set bitmap, and the code word restricted sub-set contains code words extracted from the second codebook and all code words in the first codebook; and (4) performing sub-set restriction on the code words in the first codebook and the second codebook separately, wherein each code word in the first codebook and the second codebook is associated with one information bit in the restricted sub-set bitmap, and the code word restricted sub-set contains code words extracted from the first codebook and code words extracted from the second codebook.

Preferably, the restricted sub-set bitmap contains L information bits.

When sub-set restriction is performed on the code words in the first codebook and the second codebook jointly, $L=2^{M+N}$.

When sub-set restriction is only performed on the code words in the first codebook, $L=2^M$.

When sub-set restriction is only performed on the code words in the second codebook, $L=2^N$.

When sub-set restriction is performed on the code words in the first codebook and the second codebook separately, $L=2^M+2^N$.

The first codebook contains M code words, and the second codebook contains N code words.

Preferably, the first selecting module is further configured such that the transmitting end selects the same code word restricted sub-set, or selects different code word restricted sub-sets separately according to a manner of periodic feedback and non-periodic feedback used by the receiving end.

Preferably, the second selecting module is further configured such that, depending on the manner of periodic feedback and the manner of non-periodic feedback used by the receiving end, if the transmitting end selects the same code word restricted sub-set and the receiving end feeds back the index of the optimal pre-coded code word periodically using a codebook sampling method, the receiving end selects the optimal pre-coded code word from an intersection of the sampled codebook sub-set and the code word restricted sub-set according to a sampling rule.

The code word restricted sub-set further contains all code words in a single codebook in the case where the single codebook is used; the second selecting module is further configured to select the optimal pre-coded code word from the code words of the first codebook and the second codebook contained in the code word restricted sub-set, or select the optimal pre-coded code word from the code words of the single codebook contained in the code word restricted sub-set, according to values of transmission ranks.

A device for configuring codebooks according to an embodiment of the present invention applied in a LTE-A system comprises a first selecting module and a first transmitting and receiving module.

The present invention will be described below in further detail with reference to the specific application examples. The following application examples are described by mainly taking sub-set restriction on code words of a codebook in a closed-loop spatial multiplexing transmission mode as an example, but the present invention is not limited thereto.

Application Example One

In the LTE-A system, multiple antennae are configured in a base station of a transmitting end and user equipment (UE) of a receiving end, and the base station sends information to the UE using a closed-loop spatial multiplexing mode based on pre-coding. The base station and the UE know the pre-coded codebooks in advance. Herein, the pre-coded codebooks are of an enhanced dual-codebook configuration. The base station knows multiple codebook sub-sets in which sub-set restriction is performed on the first codebook and the second codebook jointly (i.e., the code word restricted sub-sets), and each codebook sub-set contains part or all of the code words of the first and second codebooks. The base station selects one of the codebook sub-sets according a certain mechanism and notifies the UE, through a high-layer signaling, for example through a radio resource control (RRC) signaling, to restrict the codebook in the sub-set for search and selection when selecting the optimal pre-coded code word, and then feed back the index of the selected optimal pre-coded code word to the transmitting end.

It is assumed that the first codebook and the second codebook known by the base station and UE in advance have the codebook constitution form shown in Table 1. The size of the first codebook is 3 bits, and the size of the second codebook is 2 bits.

TABLE 1

The first codebook and the second codebook in a certain antenna configuration

| Index | First codebook C1 | Second codebook C2 | Index | First codebook C1 | Second codebook C2 |
|---|---|---|---|---|---|
| 0 | $W_0^1$ | $W_0^2$ | 4 | $W_4^1$ | |
| 1 | $W_1^1$ | $W_1^2$ | 5 | $W_5^1$ | |
| 2 | $W_2^1$ | $W_2^2$ | 6 | $W_6^1$ | |
| 3 | $W_3^1$ | $W_3^2$ | 7 | $W_7^1$ | |

Using the method of performing sub-set restriction on the code words in the first and second codebooks jointly, a code word in the first codebook and a code word in the second codebook are taken as a code word combination, and each code word combination is associated with one information bit in the restricted sub-set bitmap. The bitmap is arranged in a form of bit sequence of $a_{L-1}, \ldots, a_3, a_2, a_1, a_0$. When the value of the information bit in the bitmap is 1, it is indicated that the associated code word is selected in the restricted sub-set, while when the value of the information bit is 0, it is indicated that the associated code word is not selected in the restricted sub-set. At this point, the association relationship between the bitmap and code word index is as shown in Table 2.

Using the method of performing sub-set restriction on the code words in the first and second codebooks jointly, the number of information bits or the number of bits of the restricted sub-set bitmap of the selected code word restricted sub-set required to be informed to the UE is $L=2^{3+2}=32$.

TABLE 2

Association relationship between the bitmap and code word index under sub-set restriction on the first codebook and the second codebook jointly

| C1 index | C2 index | Bitmap | C1 index | C2 index | Bitmap |
|---|---|---|---|---|---|
| 0 | 0 | $a_0$ | 4 | 0 | $a_{16}$ |
| 0 | 1 | $a_1$ | 4 | 1 | $a_{17}$ |
| 0 | 2 | $a_2$ | 4 | 2 | $a_{18}$ |
| 0 | 3 | $a_3$ | 4 | 3 | $a_{19}$ |
| 1 | 0 | $a_4$ | 5 | 0 | $a_{20}$ |
| 1 | 1 | $a_5$ | 5 | 1 | $a_{21}$ |
| 1 | 2 | $a_6$ | 5 | 2 | $a_{22}$ |
| 1 | 3 | $a_7$ | 5 | 3 | $a_{23}$ |
| 2 | 0 | $a_8$ | 6 | 0 | $a_{24}$ |
| 2 | 1 | $a_9$ | 6 | 1 | $a_{25}$ |
| 2 | 2 | $a_{10}$ | 6 | 2 | $a_{26}$ |
| 2 | 3 | $a_{11}$ | 6 | 3 | $a_{27}$ |
| 3 | 0 | $a_{12}$ | 7 | 0 | $a_{28}$ |

TABLE 2-continued

Association relationship between the bitmap and code word index under sub-set restriction on the first codebook and the second codebook jointly

| C1 index | C2 index | Bitmap | C1 index | C2 index | Bitmap |
|---|---|---|---|---|---|
| 3 | 1 | $a_{13}$ | 7 | 1 | $a_{29}$ |
| 3 | 2 | $a_{14}$ | 7 | 2 | $a_{30}$ |
| 3 | 3 | $a_{15}$ | 7 | 3 | $a_{31}$ |

Application Example Two

In the LTE-A system, multiple antennae are configured in a base station of a transmitting end and user equipment (UE) of a receiving end, and the base station sends information to the UE using a closed-loop spatial multiplexing mode based on pre-coding. The base station and the UE know the pre-coded codebooks in advance. Herein, the pre-coded codebooks are of an enhanced dual-codebook configuration. The base station knows multiple codebook sub-sets in which sub-set restriction is performed only on the first codebook (i.e., the code word restricted sub-sets), and each codebook sub-set contains code words extracted from the first codebook and all code words in the second codebook. The base station selects one of the codebook sub-sets according a certain mechanism and notifies the UE, through a high-layer signaling, for example through a radio resource control (RRC) signaling, to restrict the codebook in the sub-set for search and selection when selecting the optimal pre-coded code word, and then feed back the index of the selected optimal pre-coded code word to the transmitting end.

It is assumed that the first codebook and the second codebook known by the base station and UE in advance still have the codebook constitution form shown in Table 1. The size of the first codebook is 3 bits, and the size of the second codebook is 2 bits.

Using the method of performing sub-set restriction only on the code words in the first codebook, each code word in the first codebook is associated with one information bit in the restricted sub-set bitmap. The bitmap is arranged in a form of bit sequence of $a_{L-1}, \ldots, a_3, a_2, a_1, a_0$. When the value of the information bit in the bitmap is 1, it is indicated that the associated code word is selected in the restricted sub-set, while when the value of the information bit is 0, it is indicated that the associated code word is not selected in the restricted sub-set. At this point, the association relationship between the bitmap and code word index is as shown in Table 3.

TABLE 3

Association relationship between the bitmap and code word index under sub-set restriction only on the first codebook

| C1 index | Bitmap | C1 index | Bitmap |
|---|---|---|---|
| 0 | $a_0$ | 4 | $a_4$ |
| 1 | $a_1$ | 5 | $a_5$ |
| 2 | $a_2$ | 6 | $a_6$ |
| 3 | $a_3$ | 7 | $a_7$ |

Using the method of performing sub-set restriction only on the first codebook, the number of information bits or the number of bits of the restricted sub-set bitmap of the selected code word restricted sub-set required to be informed to the UE L=$2^3$=8.

Application Example Three

In the LTE-A system, multiple antennae are configured in a base station of a transmitting end and user equipment (UE) of a receiving end, and the base station sends information to the UE using a closed-loop spatial multiplexing mode based on pre-coding. The base station and the UE know the pre-coded codebooks in advance. Herein, the pre-coded codebooks are of an enhanced dual-codebook configuration. The base station knows multiple codebook sub-sets in which sub-set restriction is performed only on the second codebook (i.e., the code word restricted sub-sets), and each codebook sub-set contains code words extracted from the second codebook and all code words in the first codebook. The base station selects one of the codebook sub-sets according a certain mechanism and notifies the UE, through a high-layer signaling, for example through a radio resource control (RRC) signaling, to restrict the codebook in the sub-set for search and selection when selecting the optimal pre-coded code word, and then feed back the index of the selected optimal pre-coded code word to the transmitting end.

It is assumed that the first codebook and the second codebook known by the base station and UE in advance still have the codebook constitution form shown in Table 1. The size of the first codebook is 3 bits, and the size of the second codebook is 2 bits.

Using the method of performing sub-set restriction only on the code words in the second codebook, each code word in the second codebook is associated with one information bit in the restricted sub-set bitmap. The bitmap is arranged in a form of bit sequence of $a_{L-1}, \ldots, a_3, a_2, a_1, a_0$. When the value of the information bit in the bitmap is 1, it is indicated that the associated code word is selected in the restricted sub-set, while when the value of the information bit is 0, it is indicated that the associated code word is not selected in the restricted sub-set. At this point, the association relationship between the bitmap and code word index is as shown in Table 4.

Using the method of performing sub-set restriction only on the second codebook, the number of information bits or the number of bits of the restricted sub-set bitmap of the selected code word restricted sub-set required to be informed to the UE L=$2^2$=4.

TABLE 4

Association relationship between the bitmap and code word index under sub-set restriction only on the second codebook

| C2 index | Bitmap |
|---|---|
| 0 | $a_0$ |
| 1 | $a_1$ |
| 2 | $a_2$ |
| 3 | $a_3$ |

Application Example Four

In the LTE-A system, multiple antennae are configured in a base station of a transmitting end and user equipment (UE) of a receiving end, and the base station sends information to the UE using a closed-loop spatial multiplexing mode based on pre-coding. The base station and the UE know the pre-coded codebooks in advance. Herein, the pre-coded codebooks are of an enhanced dual-codebook configuration. The base station knows multiple codebook sub-sets in which sub-set restriction is performed on the first codebook and the second codebook separately (i.e., the code word restricted sub-sets), and each codebook sub-set contains code words extracted from the first codebook and code words extracted from the second codebook. The base station selects one of the codebook sub-sets according a certain mechanism and notifies the UE, through a high-layer signaling, for example through a radio resource control (RRC) signaling, to restrict the codebook in the sub-set for search and selection when selecting the optimal pre-coded code word, and then feed back the index of the selected optimal pre-coded code word to the transmitting end.

It is assumed that the first codebook and the second codebook known by the base station and UE in advance still have the codebook constitution form shown in Table 1. The size of the first codebook is 3 bits, and the size of the second codebook is 2 bits.

Using the method of performing sub-set restriction on the code words in the first codebook and the second codebook separately, each code word in the first codebook and the second codebook is associated with one information bit in the restricted sub-set bitmap. The bitmap is arranged in a form of bit sequence of $a_{L-1}, \ldots, a_3, a_2, a_1, a_0$. When the value of the information bit in the bitmap is 1, it is indicated that the associated code word is selected in the restricted sub-set, while when the value of the information bit is 0, it is indicated that the associated code word is not selected in the restricted sub-set. At this point, the association relationship between the bitmap and code word indices is as shown in Table 5.

Using the method of performing sub-set restriction on the code words in the first codebook and the second codebook separately, the number of information bits or the number of bits of the restricted sub-set bitmap of the selected code word restricted sub-set required to be informed to the UE is $L=2^3+2^2=12$.

TABLE 5

Association relationship between the bitmap and code word index under sub-set restriction on the first codebook and the second codebook separately

| C1 index | Bitmap | C2 index | Bitmap |
|---|---|---|---|
| 0 | $a_0$ | 0 | $a_8$ |
| 1 | $a_1$ | 1 | $a_9$ |
| 2 | $a_2$ | 2 | $a_{10}$ |
| 3 | $a_3$ | 3 | $a_{11}$ |
| 4 | $a_4$ | | |
| 5 | $a_5$ | | |
| 6 | $a_6$ | | |
| 7 | $a_7$ | | |

Application Example Five

In the LTE-A system, multiple antennae are configured in a base station of a transmitting end and user equipment (UE) of a receiving end, and the base station sends information to the UE using a closed-loop spatial multiplexing mode based on pre-coding. The base station and the UE know the pre-coded codebooks in advance. Herein, the pre-coded codebooks are of an enhanced dual-codebook configuration. The base station knows multiple codebook sub-sets in which sub-set restriction is performed on the first codebook and the second codebook separately (i.e., the code word restricted sub-sets), and each codebook sub-set contains code words extracted from the first codebook and code words extracted from the second codebook. The base station selects one of the codebook sub-sets according a certain mechanism and notifies the UE, through a high-layer signaling, for example through a radio resource control (RRC) signaling, to restrict the codebook in the sub-set for search and selection when selecting the optimal pre-coded code word, and then feed back the index of the selected optimal pre-coded code word to the transmitting end.

It is assumed that the dual codebooks known by the base station and UE in advance are constituted using the following method.

When the transmission rank (RI) is very low, for example, when RI=1 or RI=2, but the present invention is not limited thereto, the UE feeds back pre-coded information in a manner of dual codebooks; when the transmission rank is high, for example, when RI>2, but the present invention is not limited thereto, the UE feeds back pre-coded information in a manner of single codebook. In dual codebooks portion, the size of the first codebook is 3 bits, and the size of the second codebook is 2 bits. The size of the codebook in the single codebook portion is 3 bits.

The codebook constitution form shown in Table 6 is used in this example.

TABLE 6

Codebook under a certain antenna configuration

| | RI = 1 | | RI = 2 | | RI > 2 |
|---|---|---|---|---|---|
| Index | First codebook C1 | Second codebook C2 | First codebook C1 | Second codebook C2 | Single codebook |
| 0 | $W_0^1$ | $W_0^2$ | $W_4^1$ | $W_2^2$ | $W_0$ |
| 1 | $W_1^1$ | $W_1^2$ | $W_5^1$ | $W_3^2$ | $W_1$ |
| 2 | $W_2^1$ | | $W_6^1$ | | $W_2$ |
| 3 | $W_3^1$ | | $W_7^1$ | | $W_3$ |
| 4 | | | | | $W_4$ |
| 5 | | | | | $W_5$ |
| 6 | | | | | $W_6$ |
| 7 | | | | | $W_7$ |

Using the method of performing sub-set restriction on the code words in the first codebook and the second codebook separately, each code word in the first codebook and the second codebook is associated with one information bit in the restricted sub-set bitmap. The bitmap is arranged in a form of bit sequence of $a_{L-1}, \ldots, a_3, a_2, a_1, a_0$. When the value of the information bit in the bitmap is 1, it is indicated that the associated code word is selected in the restricted sub-set, while when the value of the information bit is 0, it is indicated that the associated code word is not selected in the restricted sub-set.

It should be noted here that since a single codebook is used in the case of high transmission rank, sub-set restriction is only performed on the codebook portion of the dual codebooks during sub-set restriction, and the single codebook portion is not restricted any more. Therefore, the codebook restricted sub-set formed at this time contains the code words extracted from the first codebook and the code words extracted from the second codebook as well as all code words in the single codebook.

The association relationship between the bitmap and the code word index is as shown in Table 7.

Using the method of performing sub-set restriction on the code words in the first codebook and the second codebook separately, the number of information bits or the number of bits of the restricted sub-set bitmap of the selected code word restricted sub-set required to be informed to the UE is $L=2^3+2^2=12$.

TABLE 7

Association relationship between the bitmap and the code word index under sub-set restriction on the first codebook and the second codebook of the dual-codebook portion separately

| RI = 1 C1 index | Bit-map | RI = 2 C1 index | Bit-map | RI = 1 C2 index | Bit-map | RI = 2 C2 index | Bit-map |
|---|---|---|---|---|---|---|---|
| 0 | $a_0$ | 0 | $a_4$ | 0 | $a_8$ | 0 | $a_{10}$ |
| 1 | $a_1$ | 1 | $a_5$ | 1 | $a_9$ | 1 | $a_{11}$ |
| 2 | $a_2$ | 2 | $a_6$ | | | | |
| 3 | $a_3$ | 3 | $a_7$ | | | | |

Application Example Six

In the LTE-A system, multiple antennae are configured in a base station of a transmitting end and user equipment (UE) of a receiving end, and the base station sends information to the UE using a closed-loop spatial multiplexing mode based on pre-coding. The base station and the UE know the pre-coded codebooks in advance. Herein, the pre-coded codebooks are of an enhanced dual-codebook configuration. The base station knows multiple codebook sub-sets in which sub-set restriction is performed on the first codebook and the second codebook separately (i.e., the code word restricted sub-sets), and each codebook sub-set contains code words extracted from the first codebook and code words extracted from the second codebook. The base station selects one of the codebook sub-sets according a certain mechanism and notifies the UE, through a high-layer signaling, for example through a radio resource control (RRC) signaling, to restrict the codebook in the sub-set for search and selection when selecting the optimal pre-coded code word, and then feed back the index of the selected optimal pre-coded code word to the transmitting end. The UE may feed back the pre-coded information to the base station using two feedback modes, periodic feedback and non-periodic feedback.

For the periodic feedback and non-periodic feedback, the base station may perform code word restriction for the periodic feedback and non-periodic feedback by selecting a codebook sub-set A through a certain mechanism, i.e., the same bitmap is used for the periodic feedback and non-periodic feedback; or for the periodic feedback and non-periodic feedback, the base station may perform code word restriction for the periodic feedback and non-periodic feedback respectively by selecting different codebook sub-sets A and B through a certain mechanism, i.e., different bitmaps are used for the periodic feedback and non-periodic feedback.

When the base station performs code word restriction for the periodic feedback and non-periodic feedback by selecting the codebook sub-set A, since the physical uplink control channel (PUCCH) bearing the periodic feedback is limited by the signaling overhead, a method of sampling the code words in the codebook will be generally used to control the overhead of feedback signaling, and the codebook sub-set sampled according to a sampling rule is C. Therefore, the codebook sub-sets A and C in which the UE searches for code words for the periodic feedback are determined simultaneously, i.e., AI C.

It is assumed that the first codebook and the second codebook known by the base station and UE in advance have the codebook constitution form shown in Table 1. Using the method of performing sub-set restriction on the code words of the first codebook and the second codebook separately, the association relationship between the bitmap and the code word index is as shown in Table 5.

When the same codebook restricted sub-set A is used for the periodic feedback and non-periodic feedback, the base station may notify, through the bitmap information $A=\{a_{11}, \ldots, a_3, a_2, a_1, a_0\}=\{0, 0, 1, 1, 0, 0, 0, 0, 1, 1, 1, 1\}$, the UE to search for the code words in the sub-set A upon periodic feedback or non-periodic feedback.

When different codebook restricted sub-sets are used for the periodic feedback and non-periodic feedback, assuming that the codebook A is used for periodic feedback and the codebook B is used for non-periodic feedback, the base station may notify, through the bitmap information $A=\{a_{11}, \ldots, a_3, a_2, a_1, a_0\}=\{0, 0, 0, 1, 0, 0, 0, 0, 1, 0, 1, 0\}$ and $B=\{a_{11}, \ldots, a_3, a_2, a_1, a_0\}=\{0, 0, 1, 1, 0, 0, 0, 0, 1, 0, 1, 0\}$, the UE to search for the code words in the sub-set A upon periodic feedback and search for the code words in the sub-set B upon non-periodic feedback.

When the same bitmap $A=\{a_{11}, \ldots, a_3, a_2, a_1, a_0\}=\{0, 0, 1, 1, 0, 0, 0, 0, 1, 1, 1, 1\}$ is used for the periodic feedback and non-periodic feedback, and the method of sampling the code words in the codebook is used for the periodic feedback, it is assumed that the sampled codebook used by periodic feedback is as shown in Table 8. At this point, the codebook sub-set for the UE to search for the code words that is determined by both the bitmap information and sampling rule is $\{W_0^1, W_1^1, W_2^1, W_3^1, W_0^2, W_1^2\}$.

TABLE 8

The first codebook and the second codebook after the codebooks of Table 1 are sampled

| Index | First codebook C1 | Second codebook C2 |
|---|---|---|
| 0 | $W_0^1$ | $W_0^2$ |
| 1 | $W_1^1$ | $W_1^2$ |
| 2 | $W_2^1$ | $W_2^2$ |
| 3 | $W_3^1$ | $W_3^2$ |

It may be understood by those skilled in the art that all or some of the steps in the described method can be implemented by related hardware instructed by programs which may be stored in computer readable storage mediums, such as read-only memory, disk or CD-ROM, etc. Alternatively, all or some of the steps in the embodiments described above may also be implemented using one or more integrated circuits. Accordingly, each module/unit in the embodiments described above may be implemented in a form of hardware, or software functional module. The present invention is not limited to combinations of hardware and software in any particular form.

Of course, other various embodiments of the present invention may also be possible. Various modifications and variations to the present invention may be made by those skilled in the art without departing from the spirit and essence of the present invention. However, these corresponding modifications and variations should be covered in the protection scope of the appended claims of the present invention.

INDUSTRIAL APPLICABILITY

By the present invention, code word restriction is implemented in the case of dual codebooks in the LTE-A system such that the calculation complexity is reduced when the receiving end selects the code word, occurrences of the case where the receiving end selects the code word wrongly are decreased, and the signaling structure in the LTE system can be inherited very well.

What is claimed is:

1. A method for configuring codebooks, which is applied in a Long Term Evolution Advanced (LTE-A) system and comprises:

a transmitting end selecting a code word restricted sub-set and informing a receiving end of the code word restricted sub-set by sending to the receiving end a signaling carrying a restricted sub-set bitmap, wherein each information bit in the restricted sub-set bitmap is associated with a code word for indicating whether the associated code word belongs to the code word restricted sub-set; the code word restricted sub-set containing part or all of code words in a first codebook and/or a second codebook; and the receiving end selecting an optimal pre-coded code word from the code word restricted sub-set and informing the transmitting end of an index of the optimal pre-coded code word;

wherein in the step of the transmitting end selecting the code word restricted sub-set and informing the receiving end of the code word restricted sub-set, the transmitting end configures the restricted sub-set bitmap in one of the following ways:

(1) performing sub-set restriction on the code words in the first codebook and the second codebook jointly, wherein a code word in the first codebook and a code word in the second codebook are taken as a code word combination, each code word combination is associated with one information bit in the restricted sub-set bitmap, and the code word restricted sub-set contains code words extracted from the first codebook and code words extracted from the second codebook;

(2) performing sub-set restriction only on the code words in the first codebook, wherein each code word in the first codebook is associated with one information bit in the restricted sub-set bitmap, and the code word restricted sub-set contains code words extracted from the first codebook and all code words in the second codebook;

(3) performing sub-set restriction only on the code words in the second codebook, wherein each code word in the second codebook is associated with one information bit in the restricted sub-set bitmap, and the code word restricted sub-set contains code words extracted from the second codebook and all code words in the first codebook; and (4) performing sub-set restriction on the code words in the first codebook and the second codebook separately, wherein, each code word in the first codebook and the second codebook is associated with one information bit in the restricted sub-set bitmap, and the code word restricted sub-set contains code words extracted from the first codebook and code words extracted from the second codebook.

2. The method according to claim 1, wherein
in the step of the transmitting end selecting the code word restricted sub-set and informing the receiving end of the code word restricted sub-set, the transmitting end informs the receiving end of the selected code word restricted sub-set through a high-layer signaling.

3. The method according to claim 2, wherein
the code word restricted sub-set further contains all code words in a single codebook in the case where the single codebook is used; and in the step of the receiving end selecting the optimal pre-coded code word from the code word restricted sub-set and informing the transmitting end of the index of the optimal pre-coded code word, the receiving end selects the optimal pre-coded code word from the code words in the first codebook and the second codebook contained in the code word restricted sub-set, or selects the optimal pre-coded code word from the code words in the single codebook contained in the code word restricted sub-set, according to values of transmission ranks.

4. The method according to claim 2, wherein
the receiving end informs the transmitting end of the index of the optimal pre-coded code word in a manner of periodic feedback and/or non-periodic feedback; and in the step of the transmitting end selecting the code word restricted sub-set and informing the receiving end of the code word restricted sub-set, the transmitting end selects the same code word restricted sub-set, or selects different code word restricted sub-sets separately according to the manner of periodic feedback and non-periodic feedback used by the receiving end.

5. The method according to claim 1, wherein
the restricted sub-set bitmap contains L information bits;
when sub-set restriction is performed on the code words in the first codebook and the second codebook jointly, $L=2^{M+N}$;
when sub-set restriction is only performed on the code words in the first codebook, $L=2^M$;
when sub-set restriction is only performed on the code words in the second codebook, $L=2^N$; and
when sub-set restriction is performed on the code words in the first codebook and the second codebook separately, $L=2^M 2^N$;
wherein M refers to the number of the code words in the first codebook, and N refers to the number of the code words in the second codebook.

6. The method according to claim 1, wherein
the code word restricted sub-set further contains all code words in a single codebook in the case where the single codebook is used; and in the step of the receiving end selecting the optimal pre-coded code word from the code word restricted sub-set and informing the transmitting end of the index of the optimal pre-coded code word, the receiving end selects the optimal pre-coded code word from the code words in the first codebook and the second codebook contained in the code word restricted sub-set, or selects the optimal pre-coded code word from the code words in the single codebook contained in the code word restricted sub-set, according to values of transmission ranks.

7. The method according to claim 1, wherein
the receiving end informs the transmitting end of the index of the optimal pre-coded code word in a manner of periodic feedback and/or non-periodic feedback; and in the step of the transmitting end selecting the code word restricted sub-set and informing the receiving end of the code word restricted sub-set, the transmitting end selects the same code word restricted sub-set, or selects different code word restricted sub-sets separately according to the manner of periodic feedback and non-periodic feedback used by the receiving end.

8. The method according to claim 1, wherein
the code word restricted sub-set further contains all code words in a single codebook in the case where the single codebook is used; and in the step of the receiving end selecting the optimal pre-coded code word from the code word restricted sub-set and informing the transmitting end of the index of the optimal pre-coded code word, the receiving end selects the optimal pre-coded code word from the code words of the first codebook and the second codebook contained in the code word restricted sub-set, or selects the optimal pre-coded code word from the code words of the single codebook contained in the code word restricted sub-set, according to values of transmission ranks.

9. The method according to claim 1, wherein
the receiving end informs the transmitting end of the index of the optimal pre-coded code word in a manner of periodic feedback and/or non-periodic feedback; and
in the step of the transmitting end selecting the code word restricted sub-set and informing the receiving end of the code word restricted sub-set, the transmitting end selects the same code word restricted sub-set, or selects different code word restricted sub-sets separately according to the manner of periodic feedback and non-periodic feedback used by the receiving end.

10. A device for configuring codebooks comprising a first selecting module and a first transmitting and receiving module, wherein
the first selecting module is configured to select a code word restricted sub-set and inform the first transmitting and receiving module of the code word restricted sub-set by sending a restricted sub-set bitmap to the first transmitting and receiving module, the code word restricted sub-set containing part or all of code words in a first codebook and/or a second codebook; and
the first transmitting and receiving module is configured to inform a receiving end of the selected code word restricted sub-set by sending to the receiving end a signaling carrying the restricted sub-set bitmap;
wherein each information bit in the restricted sub-set bitmap is associated with a code word for indicating whether the associated code word belongs to the code word restricted sub-set;
wherein
the first selecting module is configured to configure the restricted sub-set bitmap in one of the following ways:
(1) performing sub-set restriction on the code words in the first codebook and the second codebook jointly, wherein a code word in the first codebook and a code word in the second codebook are taken as a code word combination, each code word combination is associated with one information bit in the restricted sub-set bitmap, and the code word restricted sub-set contains code words extracted from the first codebook and code words extracted from the second codebook;
(2) performing sub-set restriction only on the code words in the first codebook, wherein each code word in the first codebook is associated with one information bit in the restricted sub-set bitmap, and the code word restricted sub-set contains code words extracted from the first codebook and all code words in the second codebook;
(3) performing sub-set restriction only on the code words in the second codebook, wherein each code word in the second codebook is associated with one information bit in the restricted sub-set bitmap, and the code word restricted sub-set contains code words extracted from the second codebook and all code words in the first codebook; and
(4) performing sub-set restriction on the code words in the first codebook and the second codebook separately, wherein each code word in the first codebook and the second codebook is associated with one information bit in the restricted sub-set bitmap, and the code word restricted sub-set contains code words extracted from the first codebook and code words extracted from the second codebook.

11. The device according to claim 10, wherein
the first selecting module is further configured such that:
the restricted sub-set bitmap comprises L information bits;
when sub-set restriction is performed on the code words in the first codebook and the second codebook jointly, $L=2^{M+N}$;
when sub-set restriction is only performed on the code words in the first codebook, $L=2^M$;
when sub-set restriction is only performed on the code words in the second codebook, $L=2^N$; and
when sub-set restriction is performed on the code words in the first codebook and the second codebook separately, $L=2^M 2^N$;
wherein M refers to the number of the code words in the first codebook, and N refers to the number of the code words in the second codebook.

12. A system for configuring codebooks comprising a transmitting end comprising the device according to claim 11 and a receiving end comprising a second selecting module and a second transmitting and receiving module, wherein
the second transmitting and receiving module is configured to obtain a code word restricted sub-set selected by the transmitting end and inform the second selecting module of the selected code word restricted sub-set, and inform the transmitting end of an index of an optimal pre-coded code word selected by the second selecting module; and
the second selecting module is configured to select the optimal pre-coded code word from the code word restricted sub-set, and inform the second transmitting and receiving module of the index of the optimal pre-coded code word.

13. The device according to claim 10, wherein
the first selecting module is further configured such that the transmitting end selects the same code word restricted sub-set, or selects different code word restricted sub-sets separately according to a manner of periodic feedback and non-periodic feedback used by the receiving end.

14. A system for configuring codebooks comprising a transmitting end comprising the device according to claim 10 and a receiving end comprising a second selecting module and a second transmitting and receiving module, wherein
the second transmitting and receiving module is configured to obtain a code word restricted sub-set selected by the transmitting end and inform the second selecting module of the selected code word restricted sub-set, and inform the transmitting end of an index of an optimal pre-coded code word selected by the second selecting module; and
the second selecting module is configured to select the optimal pre-coded code word from the code word restricted sub-set, and inform the second transmitting and receiving module of the index of the optimal pre-coded code word.

* * * * *